Jan. 22, 1963
G. B. LOPER ET AL
3,075,172
NORMAL MOVEOUT CORRECTION
Filed June 5, 1957
4 Sheets-Sheet 1
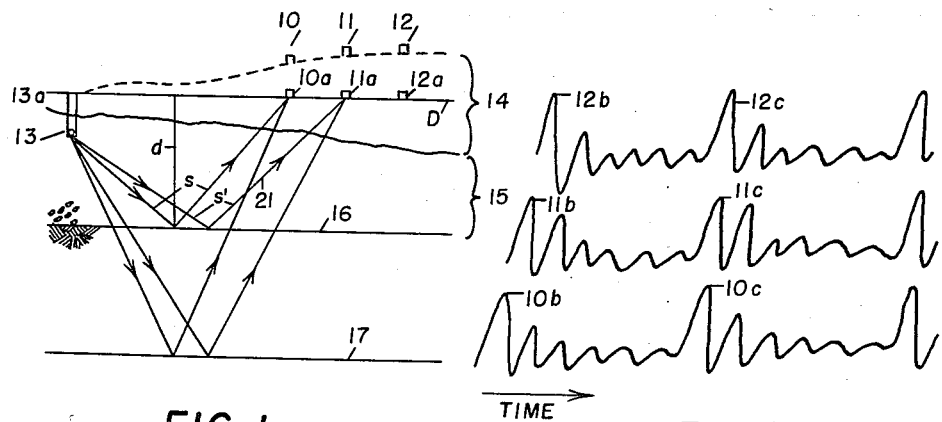
FIG. 1.
FIG. 2.
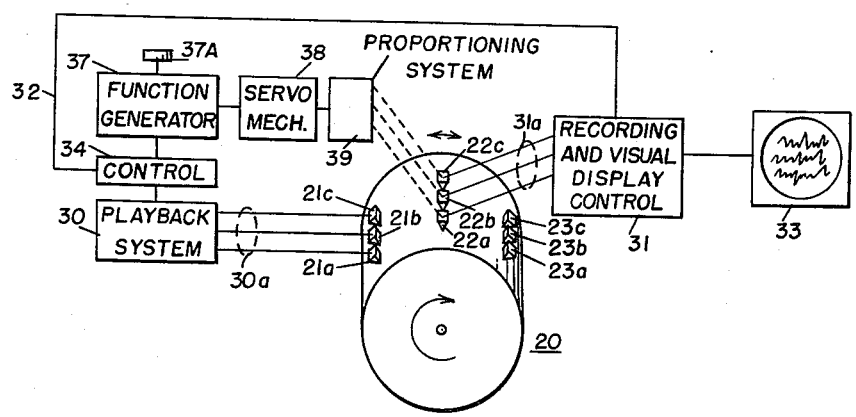
FIG. 3.

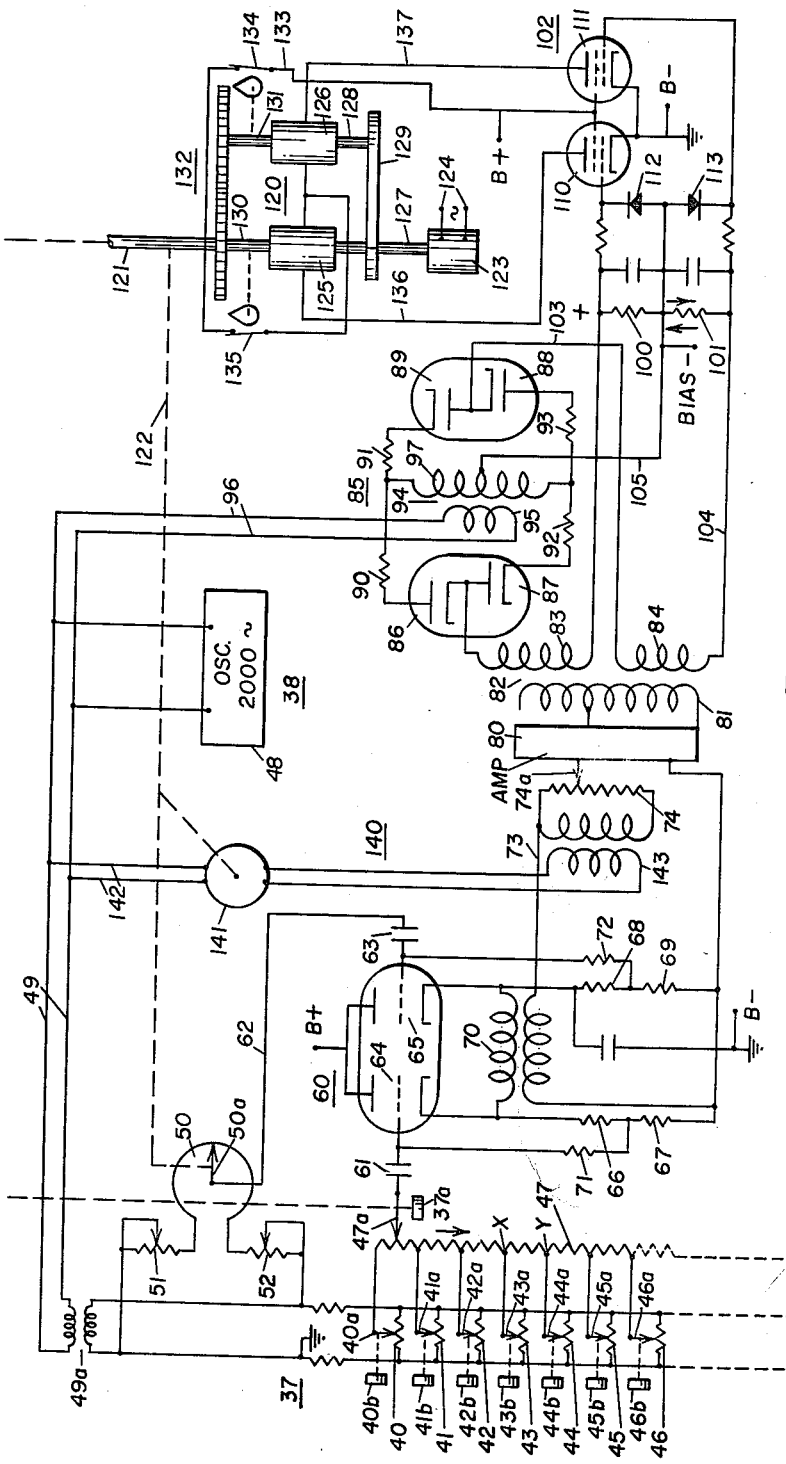

Jan. 22, 1963  G. B. LOPER ET AL  3,075,172
NORMAL MOVEOUT CORRECTION
Filed June 5, 1957  4 Sheets-Sheet 3

Jan. 22, 1963 G. B. LOPER ET AL 3,075,172
NORMAL MOVEOUT CORRECTION
Filed June 5, 1957 4 Sheets-Sheet 4
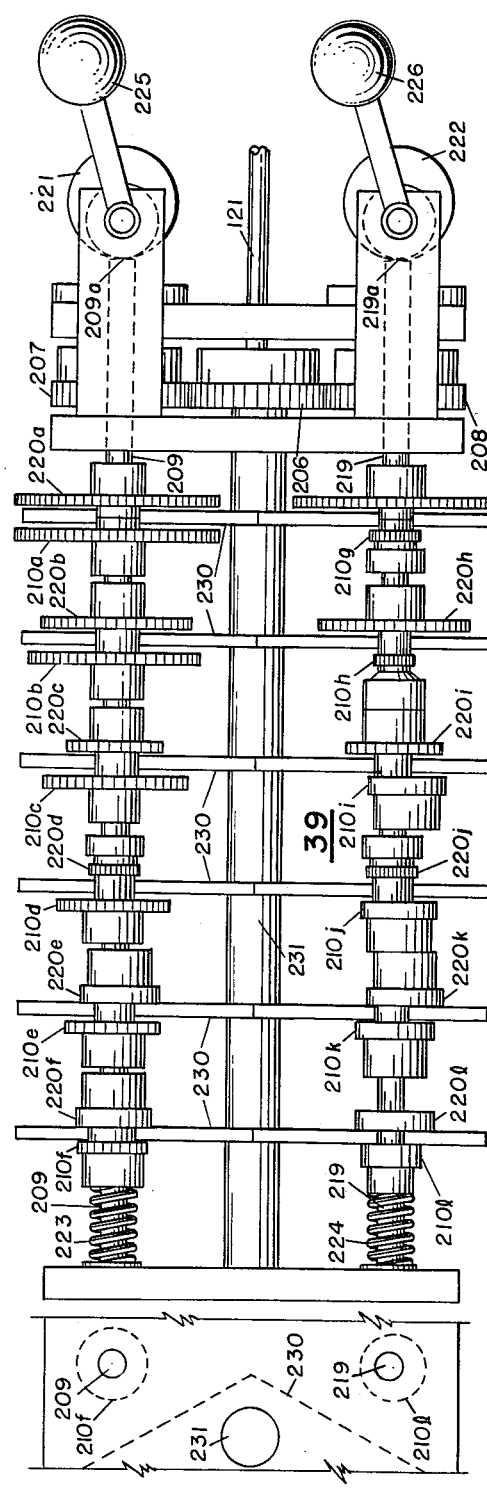
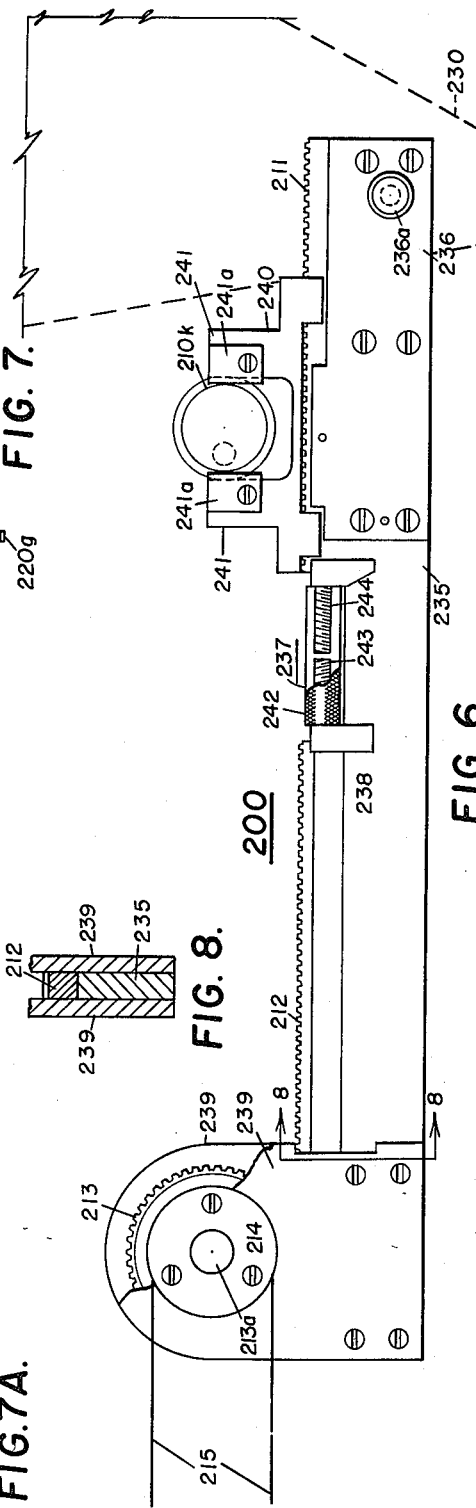
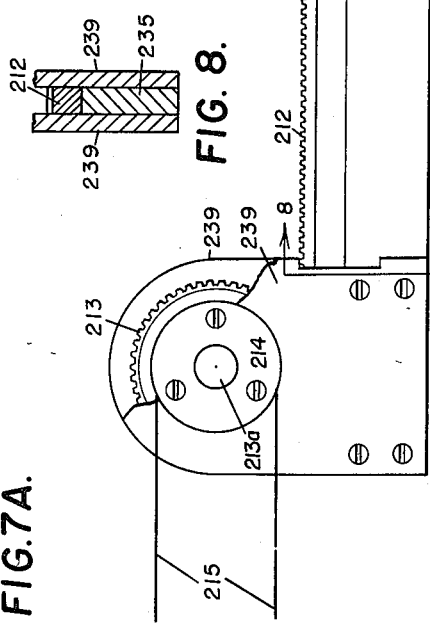

United States Patent Office 3,075,172
Patented Jan. 22, 1963

3,075,172
NORMAL MOVEOUT CORRECTION
George B. Loper, Harry A. Barclay, and Malcolm O. Johnson, Dallas, Tex., assignors, by mesne assignments, to Socony Mobil Oil Company, Inc., New York, N.Y., a corporation of New York
Filed June 5, 1957, Ser. No. 663,747
19 Claims. (Cl. 340—15.5)

This invention relates to a system for modifying the relative time relations of seismic events received at spaced receiving stations and more particularly to a system for producing an improved seismogram substantially free from such errors as are usually introduced by weathering, datum reference, and time interval deviations such as normal moveout.

It is an object of the present invention to modify the presentation of seismic events so to clarify information contained therein and to facilitate subsequent analysis thereof.

In the process of studying subsurface formations, acoustic reflections received from subsurface interfaces are recorded with respect to time. The recording, a seismogram, is produced by initiating an acoustic pulse as by the detonation of a dynamite charge. The acoustic pulse or energy travels downwardly through the formations. At each interface, a portion of this acoustic pulse or energy is reflected back to the surface. The reflected energy is received at receiving stations or geophones spaced about the shotpoint, i.e., the point of detonation and the output from each of the receiving stations is separately recorded with respect to time as a trace on a suitable recording medium.

Since the receiving stations are spaced from one another along a substantially horizontal plane at the surface, the paths from the receiving stations to a reflecting interface and thence to the shotpoint differ one from the other. Hence, the time at which a given event or reflection appears at one receiving station will differ from the arrival of the same event at another station. When these events are recorded along a common time axis, they appear displaced one from another. In addition, the time shift is a non-linear relationship changing for individual seismic records due to change in the velocity characteristics of the earth cross section along the spread of geophones.

The shift in the apparent arrival time of the recorded events makes difficult the analysis of the information to be derived from the seismogram and may, in some instances, completely obscure significant data. For example, one of the processes applied to the study of seismograms is the addition and/or multiplication of trace magnitudes in the formulation of a single composite trace. By this means, it is intended that the events become more easily recognized. However, where there is a shift in the arrival times of the events due to the spacing of the receiving stations, an error, termed normal moveout error, is introduced and the composite seismogram may not be relied upon as an accurate presentation of subsurface characteristics and for the following reason. The phase-shifted or time-shifted events when added or multiplied may cancel one another, thus disappearing in the composite seismogram. On the other hand, these steps may cause the appearance of erroneous data depicting non-existent characteristics.

The need of correcting seismic data to remove the moveout error is well-recognized in the art. In addition, it is also recognized that other corrections are to be effected in order to produce an accurate presentation of subsurface characteristics. These other corrections include compensation for weathering and datum reference.

While devices are available for introducing corrections in a manner compensatory of normal moveout error, weathering, and datum reference, the present invention provides greater flexibility and accuracy in the preparation of seismic data for subsequent analysis.

In accordance with the present invention, there is provided a system for correcting seismic signals for time errors including normal moveout error introduced by the spacing between detecting stations from a shotpoint, comprising a function generator for producing a continuous single-valued electrical signal function. A means is included for producing a plurality of electrical signals respectively representative of seismic waves at each of the detecting stations. The signal function is then applied to a means responsive to the instantaneous value of the signal function for individually altering the time relationships between the seismic signals or events and in a manner compensatory of normal moveout error.

More particularly and in a preferred embodiment of the present invention, there is provided an apparatus for removing the effects of moveout on the relative times of occurrence of seismic events received at a plurality of spaced seismic wave detectors. The apparatus includes a reproducible recording medium for recording at least portions of said traces, and a plurality of reproducing heads movable relative to the recording medium for reproducing the traces. A function generator produces a continuous single-valued signal function. The function is applied to a means responsive thereto for moving the heads relative to one another to vary the time relationship between the reproduced traces. The responsive means comprises a null-balance measuring system whose output is coupled to said recording heads for effecting the aforesaid relative movement.

In another aspect of the present invention, the function generator is readily adjusted to generate any desired corrective function to provide flexibility in correction of seismic records taken from various locations. It comprises a plurality of parallel connected potentiometers each having a movable contact. A main potentiometer, including a slidable contact, has a plurality of taps connected to said movable contacts of said parallel connected potentiometers. The slidable contact of the main potentiometer is driven in production of the signal function.

In still another aspect of the present invention, the function generator is employed in a system including the visual display of the seismic waves dynamically to set the proper function in correction of normal moveout. Means responsive to recorded signals on the seismogram synchronizes the initiation of operation of the function generator with the operation of the display system.

For other objects and advantages of the present invention, reference may be had to the following written description and accompanying drawings in which:

FIG. 1 is an explanatory figure useful in the understanding of the problem solved by the present invention;

FIG. 2 is a family of curves illustrating the effect of normal moveout on a group of seismic signals;

FIG. 3 is a block schematic of a system embodying the present invention;

FIG. 6 is an elevation view of the driving arrangement employed in the system of the present invention;

FIG. 7 is a plan view of a proportioning system for generating a family of functions compensatory of geophone spacing;

FIG. 7A is a fractional end view of the proportioning system of FIG. 7; and

FIG. 8 is a cross-sectional view taken along line 8—8 of FIG. 6.

Figures 4A, 4B, 5:
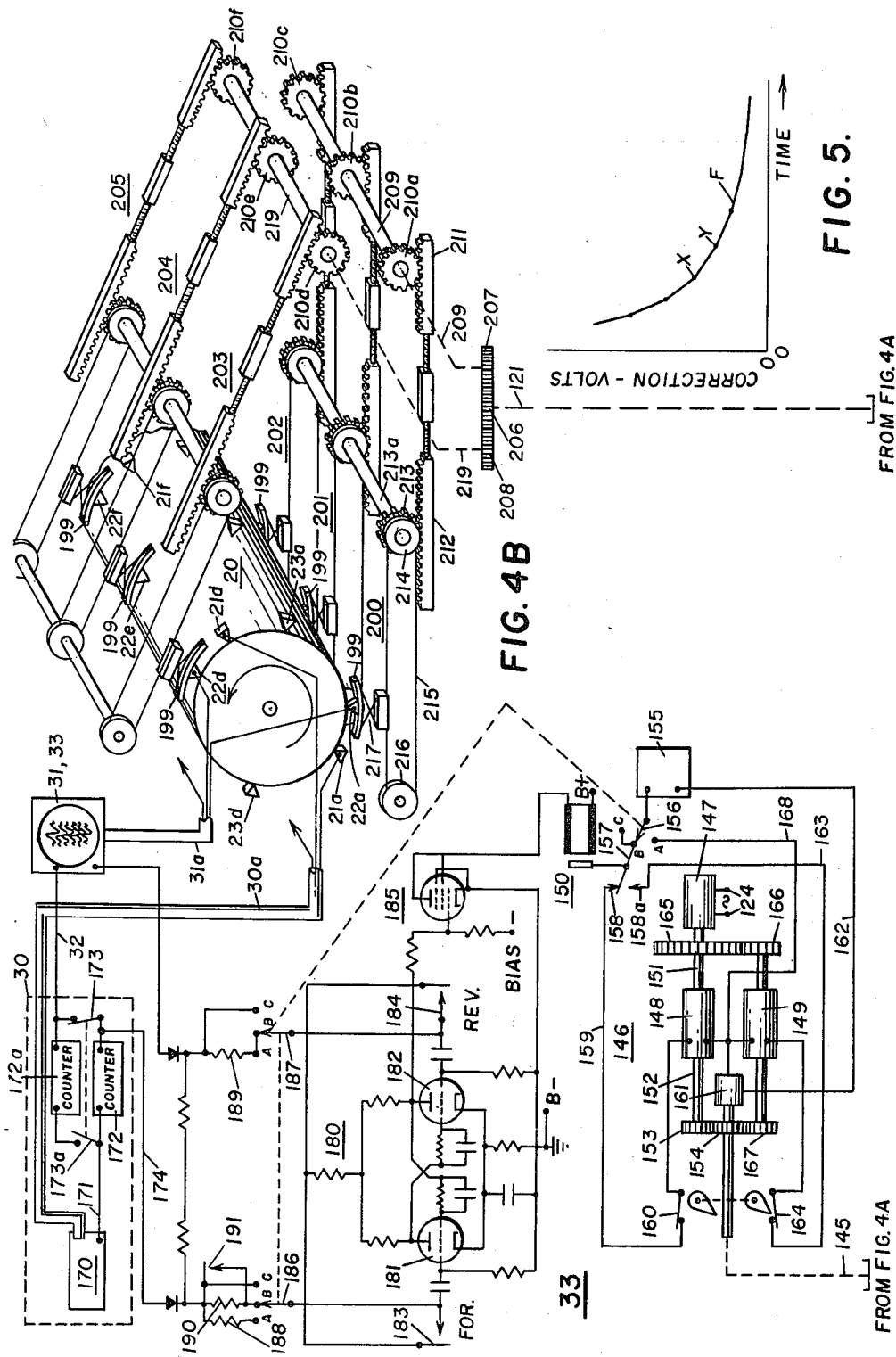
FIGS. 4A and 4B illustrate a preferred arrangement of the present invention.
FIG. 5 is a curve useful in the understanding of the present invention.

In order to better understand the present invention, there initially will be described in detail the characteristic of normal moveout and the manner in which it is introduced in a seismic record.

Referring now to FIG. 1, there is illustrated in schematic form a typical geophone array or spread comprised of geophones, or receiving stations 10–12, spaced to one side from a shotpoint 13. The geophones may also be spread about the shotpoint, on opposite sides thereof. In either event, the present invention is effective to produce corrected seismic records free of moveout. It will be understood that while only three geophones have been illustrated many more may be, and usually are, employed in production of a seismogram. For purposes of later discussion, the terrain has been illustrated to be of varying elevations and representative of typical conditions under which seismic surveys are undertaken. It is established procedure to refer the geophones 10–12 to a fixed datum or elevation which is here illustrated as the line D. This datum line may be below the weathered layer 14 or may, as illustrated, pass through the weathered layer. For the present discussion, the geophones 10–12 have been referred to the datum line and there identified respectively by reference characters 10a, 11a, and 12a.

Acoustic energy originates from shotpoint 13 at the bottom of a shot hole 13a extending through the weathered layer 14 into a consolidated layer 15. Dynamite, which is the usual form of acoustic energy, is detonated in the shot hole and the resulting acoustic waves or impulses travel downwardly through the earth formations. Portions of this energy are reflected upwardly from interfaces 16 and 17, representing changes in acoustic properties of earth strata, and are received at the receiving stations 10a–12a. For example, acoustic energy traveling along path s is received first at the receiving station 10a. This same wave traveling along path s' is later received at the receiving station 11a. In like manner, reflections are received from the interface 17.

The characteristic of the signals received at the geophones 10a–12a is illustrated in FIG. 2 by a portion of a typical seismogram. The energy received at the receiving station 10a from the interface 16 is represented by the pulse 10b which arrives first in time. At a later time the pulse 11b arrives at the receiving station 11a, while at a still later time the pulse 12b arrives at the receiving station 12a. The energies reflected from the interface 17 are identified by the reference characters 10c, 11c, and 12c.

It will be observed from FIG. 2 that the pulses 10b–12b are displaced in time one from the other due to the increase in the length of the path required for the seismic wave to travel from the shotpoint to the receivers by way of reflection from a given interface. For example, the path s' is longer than the path s; and, hence, the energy received by the receiver 11a will arrive at a time later than the energy received at the receiver 10a. This time delay, termed normal moveout, may be defined as the difference between the length of the path s from the shotpoint 13 to the detector 10a and twice the vertical distance d from the datum plane D to the reflecting bed of interface 16.

The normal moveout varies and becomes successively smaller for reflections from deeper interfaces. It approaches zero for beds of infinite depth. The variation in time difference is a non-linear relationship which will change for each seismic record due to a change in the velocity characteristics of the earth strata under investigation. The variation is illustrated in FIG. 2 where it will be noted that the time difference in the arrivals of acoustic energy from the deep interface 17 to the receivers 10a–12a is less than the time difference between the acoustic energy pulses received from the shallower interface 16.

A system embodying the present invention and possessing the flexibility required to carry out the necessary corrective functions is schematically illustrated in FIG. 3. While the present invention is useful in the field correction of seismic records or seismograms, i.e., correcting seismic signals as they are detected at the geophones, it will be described specifically with respect to the correction of previously recorded seismic records.

Included in the system of FIG. 3 is a delay-line means shown as a time delay-line drum 20, having at least one and preferably a plurality of recording means 21a–21c, detecting means 22a–22c, and erasing means 23a–23c. The number of recording means, detecting means, and erasing means will vary with the number of seismic traces to be corrected simultaneously. For purposes of simplification, only three of each have been illustrated in FIG. 3.

Electrical signals representative of seismic signals are produced from a previously recorded seismogram by way of a playback system 30 and are continuously applied by way of conductors 30a to the recording heads 21a–21c. The drum 20, having a magnetic recording medium on the surface thereof, is rotated to bring the newly recorded signals to a position where they are detected by the detecting means or pickup heads 22a–22c. Each pickup head is associated with one of the recording heads and together operate upon a single seismic trace.

The seismic traces, as recorded on the drum 20, include the moveout error. This error is removed and the seimic signals corrected by adjusting the position of the pickup heads 22a–22c relative to the recording heads 21a–21c and to each other. The continued movement of the drum carries the recording surface past the erasing means or heads 23a–23c. The signals are removed and the drum rotated to bring a magnetically clean recording surface again to the recording heads 21a–21c. The corrected seismic signals as detected at the pickup heads 22a–22c are applied by way of conductors 31a to a re-recording and visual display control means 31 where a new seismogram, free of moveout error, is produced.

The moveout error is a varying function. Accordingly, it is required that the positions of the pickup heads 22a–22c be changed relative to the recording heads 21a–21c and in accordance with the moveout function in order to compensate for and effectively remove the normal moveout error from the seismogram being produced by the re-recording means 31.

In accordance with the present invention, the positions of the pickup heads 22a–22c are adjusted in accordance with the output of a function generator 37. The output signal from the generator preferably is a single-valued electrical signal, i.e., an electrical signal which does not change in sign. It is representative of the variation of the normal moveout with respect to time. As will be discussed in greater detail hereinafter, the function generator is capable of producing any desired function to compensate for the many variations encountered in the rate of change of normal moveout. It is effectively a non-linear potentiometer whose output may be varied with respect to time. Means for varying the output is represented by control knob 37a.

The electrical signal or function is applied to a servomechanism 38 whose mechanical output is transmitted to the pickup heads 22a–22c by way of a proportioning system 39. The proportioning system provides a means for generating from the corrective function a series or family of functions, each one of which is specifically associated with one of the pickup heads 22a–22c. As may be observed from FIG. 2, the initial time-delay introduced by the normal moveout increases with the distance from the shotpoint. Accordingly, the first event 12b, representative of signals from geophone 12a, is delayed more than the first events 10b and 11b, representative of signals obtained at the geophones 10a and 11a. The seismic trace produced from the furthest geophone 12a has the greatest time delay. Accordingly, at the time the moveout correction is begun, the pickup head 22a associated with the trace including event 12b will be closer to the recording heads 21a–21c than any of the other pickup heads 22b, 22c. At the end of the seismogram or at any point where the normal moveout error is substantially zero, the pickup heads will be in alignment. Accordingly, each of the pickup heads is adjusted in accordance with a separate function as produced by the proportioning system in response to the control function generated by the function generator 37.

Each function produced by the proportioning system is related to the other functions of the system in accordance with the physical positions of each of the geophones in the spread. Thus, these functions will vary with different geophone spreads. In practice, the functions are determined by the ratio between the distance of the geophones from the shotpoint. For example, if the distance between each geophone is the same as the distance between the shotpoint and the first geophone, the function for the fourth geophone in the spread would introduce sixteen times the delay introduced by the function for the first geophone; twenty-five times for the fifth geophone; and so on. The present invention makes provision for different geophone spreads. A specific provision will be described hereinafter in conjunction with a preferred embodiment of a proportioning system.

In accordance with the present invention, the function generator may be synchronized with the playback of the seismogram by the playback system 30. More particularly, a control system 34 responds to a predetermined signal usually the time-break pulse recorded on the seismogram to begin the generation of the function. The control system also transmits an initiating pulse to the recording and visual display control 31 by way of cable 32.

The effect of the correction upon the seismogram as effected by the function generator and its associated apparatus is visually displayed at the face of a cathode-ray oscilloscope 33. By this means, the operator may determine the character of the function generated by the function generator 37 in order to remove the normal moveout error on the seismogram. The necessary adjustment for this purpose is carried out dynamically, i.e., the operator can vary the function during the time the seismogram is being played back to produce at the face of the cathode-ray tube a representation of a seismogram free of moveout error. When he has become satisfied with the representation, he may then produce a permanent record of the corrected seismogram. The permanent recordings may be made by photographing the display at the face of the cathode-ray oscilloscope 33 or by way of a conventional oscillographic recorder. On the other hand, where further studies are desired at a later date and additional modifications of the seismic traces are to be carried out such as, for example, compositing, a new magnetic recording may be produced.

A suitable playback system and visual display arrangement is disclosed and claimed in the Loper and Pittman Application, Serial No. 388,529, entitled "Ring Counter Cyclic Reset Control." It is also disclosed in an article entitled "Cathode-Ray Display of Seismic Records" by Groenendyke and Loper. The article appeared in the May 1955 edition of Electronics, published by McGraw-Hill Publishing Company, Inc. Briefly, the display system as illustrated in FIG. 3 includes the playback system for playing back field seismograms which may have been recording previously on magnetic tapes or as variable area or variable density film recordings. In the preferred embodiment, magnetic tapes are employed.

The seismic trace recordings on the magnetic tape are translated into electrical signals and applied by way of conductor or cable 32 to the re-recording and visual display control 31 which controls the sweep and modulation of cathode-ray oscilloscope 33. The system includes controls whereby selective portion of the seismic record may be displayed at a persistence-of-vision rate such that the selected portions may be carefully studied. As more specifically set forth in the aforesaid application and article, this control is responsive to the time-break pulse recorded on the magnetic tape and in a manner well-known in the art and to timing pulses also recorded on the tape to count down to a time interval representative of the selective portion to be displayed. The timing pulses and the time-break pulses are, as above-described, transmitted by way of cable 32 to the display control 31.

A preferred embodiment of the present invention is illustrated schematically in FIGS. 4A and 4B. The function generator 37, FIG. 4A, is of the type shown at page 263 of Electronic Analog Computers by Korn and Korn, first edition, published by McGraw-Hill Book Company. It is comprised of a plurality of parallel connected slidewires 40–46. Movable contacts 40a–46a of the slidewires 40–46 are connected to selected points along a main slidewire 47 from which the output of the function generator is derived. The character of the function to be generated is determined by the positions of the contacts 40a–46a with respect to their slidewires. The contacts are shown adjustable by way of knobs 40b–46b.

While only seven control slidewires have been illustrated, it will be understood that any number of them may be employed. The more control slidewires there are, the more accurate will be the function generated. The voltage variation between each of the selected points along the main slidewire 47 is linear. One of these variations, the voltage between voltage point X and Y along the slidewire, is illustrated in the function F, FIG. 5, as a straight line. The function F is comprised of a plurality of these linear segments. It is, therefore, obvious that the more linear segments there are in the function F, the more the function will approximate a true curve. In one embodiment of the present invention, fourteen control potentiometers were employed.

The function generator 37 is energized from oscillator 48 by way of supply lines 49 and transformer 49a. The frequency of the source is 2,000 cycles. It will be understood that other frequencies may be employed and that the value given above is merely an example.

One of the requirements of proper operation of the function generator is to avoid loading any of the control slidewires. This is accomplished by making the impedance between the selected points or taps on the main slidewire very high with respect to the impedance of the individual slidewires 40–46. This results in the maintenance of a linear output from each section of the main slidewire 47. Accordingly, scales may be provided in association with the adjusting knobs 40b–46b and the function generator effectively calibrated to produce a desired function.

Any function may be initially set into the function generator 47 and, as above-described, the correct function finally arrived at dynamically by having an operator observing the character of the seismic signals displayed at the face of the oscilloscope 33. On the other hand, a desired function may be approximated by independent calibration to represent the acoustic characteristics of the error encountered during the seismic survey. This function is then set into the function generator by adjusting the slidewires relative to the scales (not shown) which may be calibrated into terms of milliseconds or other divisions of time.

The system of the present invention is particularly adapted to dynamic correction for normal moveout error. In the operation of the system, a proper corrective function may be closely approximated by assuming the corrective function to be a hyperbolic curve. The correctness of this assumption will now be shown mathematically, beginning with the expression for normal moveout which is:

$$t_s = \frac{2\sqrt{\frac{x^2}{4}+d^2}}{v} \qquad (1)$$

where $t_s$ is the time of travel of acoustic energy along path $s$;
$x$ is the spacing horizontally between shotpoint and the detector;
$d$ is the vertical travel path; and
$v$ is the velocity of sound through the formations.

By squaring both sides of Equation 1, there is obtained $$t_s^2 = \frac{x^2 + 4d^2}{v^2} \quad (2)$$

The time required for sound to travel over path $d$ is expressed in the following equation:

$$t_d = \frac{2d}{v} \quad (3)$$

Squaring both sides of Equation 3 and solving for $d^2$, there is obtained $$d^2 = \frac{v^2 t_d^2}{4} \quad (4)$$

Substituting Equation 4 into Equation 2, the result is the expression $$t_s^2 = \frac{x^2}{v^2} + t_d^2 \quad (5)$$

Equation 5 is then solved for $t_s - t_d$ which is equal to the normal moveout correction $\Delta t$.

$$t_s^2 - t_d^2 = \frac{x^2}{v^2} \quad (6)$$

$$(t_s + t_d)(t_s - t_d) = \frac{x^2}{v^2} \quad (7)$$

$$t_s - t_d = \Delta t = \frac{x^2}{v^2(t_s + t_d)} \quad (8)$$

Since $t_s + t_d$ is approximately equal to twice the time of travel of any given reflection on a seismogram, Equation 8 may be written as an approximation in the form $$\Delta t = \frac{x^2}{v^2 2t} \quad (9)$$

If the average velocity of the formations for all record times approaches a constant at a given distance, Equation 9 may be writen as $$\Delta t = \frac{k}{t} \quad (10)$$

From Equation 10 it will be seen that under the conditions assumed, the variation of $\Delta t$, the normal moveout, as a function of time is hyperbolic.

Assuming now that the function generator has been preset to deliver the initial hyperbolic function, the generated function will be modified until the operator is satisfied with the appearance of the corrected seismic signal appearing at the face of the cathode-ray oscilloscope 33, FIG. 3. Each time the original seismogram is played back, the function is generated by uniformly moving the contact 47a relative to the slidewire 47. If necessary, the character of the initial function, here assumed to be the hyperbolic function, is modified by manipulating any, or all, of the control knobs 40b–46b until the function being generated will cause the reproduction of a seismogram free of moveout error. Each time one function has been generated, the contact 47a is rapidly returned to a starting position which, in the illustrated embodiment, is the top of the slidewire 47. The pickup heads 22a–22c are automatically returned to an initial position in response to the resetting of the slidewire.

The output signal from the function generator 37 is applied to the input of a null-balance system. As is well-known in the art, such a system includes a balancing slidewire which is adjusted at a rate and to an extent necessary to reduce an input signal to zero. The extent of movement of the balancing slidewire is proportional to the magnitude of the input signal, and this motion, a mechanical motion, is applied to set or reset some mechanical device which in the present invention is the group of pickup heads 22a–22c, FIG. 1. The null-balance system herein disclosed in effect is a balanceable transducer for translating the electrical signal function of the function generator to a mechanical function.

The null-balance system or servo-mechanism 38 includes slidewire 50 which like the function generator 37 is energized from the oscillator 48 by way of supply lines 49. The slidewire 50, which may be of the single-turn or multi-turn type, is initially calibrated for a given function generated by the function generator 37 by adjustment of the rheostats 51 and 52. The rheostats 51 and 52 are connected in series with slidewire 50 across the supply lines 49 and in parallel with the control slidewires 40–46. The calibration is carried out by placing the contact 47a in its uppermost or start position. The contact 50a will move in a clockwise direction to one end of the slidewire because of the servo nulling action. The rheostat 52 is then adjusted until the position of the mechanical system which is attached to contact 50a, namely, movable heads 22a–22c, yields a time shift or moveout correction time which is equal to the time reading on the scale associated with knob 40b. The contact 47a is then moved to its lowermost position. Contact 50a then moves to the opposite end of the slidewire 50. Adjustment of the rheostat 51 is made again to cause the moveout correction time to agree with the time setting on the scale associated with knob 46b.

In order to avoid loading the slidewire 47, its output is applied to a high impedance input of a comparison means 60 by way of capacitor 61. The output from the potentiometer slidewire 50 is applied by way of conductor 62 and capacitor 63 to a second high impedance input of the comparison means 60. The signals from the potentiometer slidewires 47 and 50 are compared to generate an error signal effective to adjust the pickup heads 22a–22c.

In the present embodiment, the comparison means is a cathode follower comprised of a pair of triodes 64, 65 enclosed within a single envelope. It will be understood that separate triodes or other multielement space-discharge tubes may be substituted. The plates of triodes 64, 65 are connected together to a source of plate supply B+. The cathode of triode 64 is connected by way of resistors 66 and 67 to the opposite side of the plate supply B—. Likewise, the cathode of triode 65 is connected by way of resistors 68 and 69 to the opposite side of the plate supply B—. The primary of transformer 70 is connected across the cathodes with the secondary of the transformer connected to the input circuit of an amplifier 80.

The grids of triodes 64, 65 are biased, respectively, by way of resistors 71 and 72. The resistors 66–69, 71 and 72 are selected so that when the system is in balance the A.C. components of currents flowing through the triodes 64 and 65 are equal and a zero A.C. potential difference appears across the primary of the transformer 70.

Now upon the application to the grids of the triodes 64 and 65 of signals of differing magnitudes as will occur when the contact 47a of slidewire 47 is moved, the signal current through the triodes 64 and 65 will vary one from the other. A potential difference will appear across the primary of transformer 70. This potential difference, or error signal, is applied by way of a secondary of transformer 70, conductor 73, and movable contact 74a of variable resistance 74 to the input of the amplifier 80.

The output from the amplifier 80 is applied to the primary 81 of the transformer 82. The transformer 82 has a split secondary comprised of windings 83 and 84. These windings form an input for a phase sensing means 85 whose output is effective to cause adjustment of the playback heads 22a–22f, FIG. 4B, of the time-delay drum 20, FIG. 4B, and to energize a follow-up system reducing the error signal to zero. The phase of the error signal applied to the amplifier 80 is dependent upon which of the triodes 64, 65 has the larger signal voltage. Since this relationship is dependent upon the direction in which the contact 47a of potentiometer 47 is moved, the phase of the error signal is representative of direction of movement of the contact 47a.

The phase detecting means 85 is comprised of a bridge circuit including serially connected diodes 86, 87, 88, and 89. Diodes of the 6AL5 type have been found satisfactory. It will be understood that other devices may be employed and that the tube type is set forth above as exemplary of a proven embodiment and not by way of limitation. The anode of diode 86 is connected to the cathode of diode 89 through serially connected resistors 90, 91. The cathode of the diode 87 is connected to the anode of the diode 88 by way of serially connected resistors 92 and 93. The bridge circuit is energized from oscillator 48 by way of a transformer 94 whose primary 95 is connected to the oscillator by conductors 96. The secondary 97 of the transformer 94 is connected between the juncture of the resistors 90, 91 and the juncture of the resistors 92, 93. The outputs from the phase detector 85 are taken across resistors 100 and 101 which are in the input circuits of a balanced output circuit 102.

In the absence of error signal, the output signals across resistors 100 and 101 are zero. The zero output is by reason of the fact that current tends to flow through each of the resistors 100 and 101 in both directions in equal amounts. This may be demonstrated by tracing the various circuits involved and following the current flow. For example, one circuit may be traced from the center tap of the secondary 97 through the lower half of the secondary, resistor 93, diode 88, conductor 103, secondary 84, conductor 104, resistor 101, and thence by way of conductor 105 to the center tap of the secondary 97. Current of opposite phase and equal magnitude flows in the resistor 101 by reason of the conduction of diode 89. The second circuit may be traced from the center tap of the secondary 97 by way of conductor 105, resistor 101, conductor 104, secondary 84, conductor 103, diode 89, resistor 91, and thence to the center tap of the secondary 97.

The current flow through the resistor 100 takes place in like manner as above-described by reason of the conduction of the diodes 86 and 87.

Now upon the production of an error signal in the secondaries 83 and 84 of the transformer 82, there will be produced a current flow through the resistors 100 and 101. Depending upon the phase of the error signal, a positive potential appears across one of the resistors 100, 101 and a negative voltage is developed across the other resistor. However, the negative potential is prevented from application to either of the grids of tubes 110, 111 by operation of the diodes 112 and 113 which, upon occurrence of the negative going signal, provide low impedance paths effectively shunting the signal. The negative bias holds the conduction of tubes 110, 111 to a low value in the absence of a positive going signal from the phase detecting means 85.

The balanced output circuit 102 is connected to means 120 for translating the variations in the electrical corrective function or error signal to a mechanical motion. The output from the means is transmitted over shaft 121 to adjust the pickup heads 22a–22f, FIG. 4B, and by way of shaft 122 to adjust the slidewire 50 to reduce the error signal to zero.

In order to assume rapid response of the shaft 121 and to avoid backlash inherent in most mechanical transmissions, the shaft 121 has applied thereto, under balanced conditions, forces of equal but opposite direction rendering the shaft immediately responsive to movement upon a change in either one of these forces. The rotative forces are supplied by way of magnetic clutches 125 and 126 coupled to motor 123. The magnetic clutch 125 has a driven element (not shown) coupled directly to shaft 127 which may be directly connected to the armature of the motor 123. The driven element (not shown) of the magnetic clutch 126 is connected to a shaft 128 connected by a suitable driving means such as, for example, a belt driven linkage 129 to the shaft 127. With such arrangement the driven elements of the magnetic clutches 125 and 126 are driven at a like speed and in the same direction. Output shafts 130 and 131, respectively of the electromagnetic clutches 125 and 126 are connected by a suitable coupling means 132 which is comprised of two gears.

With the magnetic clutches 125 and 126 energized equally, equal but opposite rotational forces will be applied to the shaft 121. The shaft 121 will remain stationary but conditioned for instantaneous response upon a change in excitation applied to either the clutch 125 or 126. The excitation circuit for the electro-magnetic clutch 125 includes the plate-cathode circuit of tube 110, and the excitation circuit for the magnetic clutch 126 includes the plate-cathode circuit of tube 111. More specifically, the excitation circuit for the magnetic clutch 125 may be traced from B+, conductor 133, switch 134, switch 135, the energizing coil of the magnetic clutch 125, conductor 136, the plate-cathode circuit of tube 110 and thence to B−. Likewise, the excitation circuit for the magnetic clutch 126 may be traced from B+, conductor 133, switch 134, switch 135, the energizing coil of magnetic clutch 126, conductor 137, the plate-cathode circuit of tube 111 and thence to B−.

Depending upon the phase of the error signal, either tube 110 or tube 111 will become more heavily conductive. The increase in current flow through the particular tube will increase the coupling afforded by either one of the magnetic clutches 125 or 126 and thereby increase the torque applied in a given direction to the shaft 121.

In order to avoid hunting in the servo-mechanism 38, there may be provided a damping circuit 140 which applies to the servo-system a current proportional to the rate of change of the rebalancing slidewire 50. This damping circuit is well-known in the art of process controls employing servo-mechanism as exemplified by FIG. 4 of U.S. Patent No. 2,113,164 issued to A. J. Williams. More particularly, the means includes a tachometer generator 141, energized from oscillator 48 by way of supply lines 142. The armature of the tachometer is mechanically coupled to shaft 122 and thus moves in accordance with movement of the slidewire 50. The output from the tachometer generator 141 is applied by way of transformer 143 to the input of the amplifier 80 to effect a virtual balance of the system and thereby avoid hunting. Accordingly, there is avoided any oscillating movement of the pickup heads 22a–22f relative to the recording drum 20 and the errors introducible by such movement.

The synchronizing of the function generator 37 with the visual display of the seismic traces on the oscilloscope 33 may be accomplished manually or it may be done automatically. In performing the manual operation, an operator may place himself before the oscilloscope 33, FIGS. 3 and 4B, and manipulate the control knob 37a to thereby vary the time shifts as the seismic traces are being displayed. Likewise, the various adjustments as to the character of the function to be generated may be varied by adjustment of the knobs 40b–46b. In yet another embodiment hereinafter described, the generation of the function may be by way of a motor which drives the contact 47a, FIG. 4A, in the generation of the function. The motor drive may be started at the discretion of the operator or the start may be synchronized with the timing markers usually recorded on seismic records in accordance with the teaching of the aforesaid Loper and Groenendyke article.

In the preferred embodiment, a motor drive is employed in the generation of the moveout correcting function. The adjustable contact 47a of the function generator slide-wire 47 is mechanically connected as by way of shaft 145, FIG. 4A, to a driving means 146, FIG. 4B. The driving means includes a motor 147 which may be constantly rotating and energized from a suitable source of supply represented by supply lines 124. The rotational movement of the motor 147 is transmitted to the shaft 145 by way of a forward and reverse transmission comprising magnetic clutches 148 and 149. The clutches 148 and 149 are selectively energized by operation of a switch 150 here illustrated as a relay control switch. For manual operation, the switch may be of the double throw, single pole type.

With the circuit connections as shown, the magnetic clutch 148 is energized to transmit driving motion from the motor 147 to the adjustable contact 47a of the potentiometer 47, FIG. 4A, by way of shaft 151, clutch 148, shaft 152, gears 153 and 154, and shaft 145. The energizing circuit of the clutch 148 may be traced from a source of supply 155, movable contact 156, relay actuated contact 157, fixed contact 158, conductor 159, cam operated switch 160, the energizing coil of the magnetic clutch 148, magnetic brake 161, and thence by way of conductor 162 to the other side of the source of supply 155. As the movable contact 47a, FIG. 4A, reaches the end of the potentiometer 47 in the direction illustrated by the arrow, the cam operated switch 160 is opened and the clutch 148 de-energized to bring the movable contact 47a to a halt. At the same time the circuit of the magnetic brake 161 is opened to lock the shaft 145 against further movement. Similarly, the shaft 145 is locked in a fixed position when the movable contact 47a is returned to the start position and the other cam operated switch 164 is opened.

The movable contact 47a is returned to a start position preparatory to the regeneration of a like or different function by moving the movable contact 157 of switch 150 into engagement with a fixed contact 158a. This results in the energization of the magnetic clutch 149 for transmission of motion to the movable contact 47a in an opposite direction. The circuit of the magnetic brake 161 is closed to release the shaft 145 for movement. The energizing circuit for clutch 149 may be traced from the source of supply 155, movable contact 156, movable contact 157, fixed contact 158a, conductor 163, cam operated switch 164, the energizing coil of the magnetic clutch 149, the magnetic brake 161, and thence by way of conductor 162 to the opposite side of the source of supply 155. With the magnetic clutch energized, motion is transmitted from the motor 147, gear 165, gear 166, clutch 149, gear 167, gear 154, and shaft 145 to the movable contact 47a.

In a preferred arrangement, the return movement of the movable contact 47a is at a rate much faster than the motion of the contact during the generation of the function. In one embodiment of the present invention now in use, the return speed of the contact 47a is 4 times its generating speed and is provided by proper selection of the gears 165 and 166. The motor 147 may be of the constant speed type, arranged continuously to rotate. The motor may have included therewith a gear reduction so that the shaft 151 will rotate at a speed of one revolution per second. The potentiometer 47 in one operative arrangement was of the helical type requiring three revolutions of shaft 145 to move the contact 47a from one end to the other of the potentiometer. It will be understood that the above illustrations have been set forth by way of explanation and are not to be considered as a limitation upon the operation of the present invention.

During the course of operation, it will be desirable to manually drive or position the contact 47a in the generation of a correcting function. With the contact 47a stopped at any of the various intermediate points in the function, there is made possible a steady long-term study of any one value of moveout time on the oscilloscope and the corresponding adjustment of knob 40b–46b can be made for best results. Accordingly, there is provided an arrangement whereby the magnetic brake 161 may be released to thereby permit the manual adjustment of the contact 47a. It will be recalled that when the brake circuit is closed, the brake is energized and in a release position. The brake is released for manual adjustment of the contact 47a by moving contact 156 to its A position, thus completing an energizing contact for the brake 161 without energizing either of the clutches 148, 149. The energized circuit may be traced from the source of supply 155, switch contact 156, conductor 168, magnetic brake 161, and thence by way of conductor 162 to the other side of the source of supply 155.

Where the moveout correction system is made semi-automatic or fully automatic, the operation of the function generator may be controlled from the time markers recorded on the seismic record. In a preferred embodiment, the operation is begun in response to the time-break marker recorded on the seismic record and in a manner now to be described.

The seismic record is scanned by the playback apparatus 30, FIG. 4B, in a manner disclosed in the aforesaid Loper and Groenendyke article. Electrical signals representative of the seismic traces are transmitted by way of cable 30a from a suitable transducer 170 to recording heads 21a–21f on the recording drum 20. The sweep of the oscilloscope 31, 33 is begun in response to the time-break applied from the transducer 170 as by way of conductor 171, counter 172, switch 173, and conductor 32. A signal is also applied from the output of the counter 172 by way of conductor 174 to trigger a bi-stable multivibrator 180 and initiate the generation of the moveout correcting function.

The multivibrator 180 includes two stages 181 and 182. When the stage 181 is rendered conductive, the stage 182 is rendered nonconductive. The increase in plate voltage of stage 182 when applied to the input of an amplifier 185 causes an increased conduction of the amplifier to operate the relay switch 150 to connect the circuits for the generation of the corrective function as above described. Likewise, when the stage 182 is rendered conductive, the stage 181 is rendered nonconductive. The resulting drop of the plate voltage of the stage 182 causes a sufficient reduction in the conduction of the amplifier stage 185 to cause the relay switch 150 to become de-energized and to connect the circuits for a reverse operation to return of the movable contact 47a, FIG. 4A, to a start position.

The multivibrator 180 is arranged to be triggered manually or in response to the signal generated at the output of the counter 172. Manual operation is controlled by switches 183 and 184. The generation of the function is begun by closing switch 183 to apply a positive going voltage from source B+ to the input circuit of stage 181. The positive voltage causes stage 181 to conduct; and in accordance with typical multivibrator operation, the stage 182 is cut off. When the function has been generated, the function generator is reset by closing switch 184 to complete a circuit applying a positive voltage from source B+ to the input circuit of stage 182. The stage 182 begins to conduct and the multivibrator is returned to its initial condition.

Manual or automatic operation is selected by mechanically ganged switches having movable contacts 186, 187, and 156. For example, with the switches in a first or A position, the system is connected for manual operation. A high impedance or resistor 188 is added in series circuit with the movable contact 186, rendering the system nonresponsive to pulses from the counter 172.

It will be observed that the movable contact 156 in its A position completes a circuit for release of the magnetic brake 161 to permit manual generation of the moveout correcting function. Likewise, a high resistance 189 is added in series with the movable contact 187 which connects the input of stage 182 with the oscilloscope 31, 33 and renders the stage 182 nonresponsive to a flyback pulse from the oscilloscope.

With the switches 186, 187, and 156 in position B, the system is semi-automatic, arranged for an automatic start of the function generator at the discretion of the operator and a manual resetting thereof to produce a single function. The start, at a time the operator selects, is in response to a prerecorded pulse on the seismogram and transmitted by counter 172 to the input circuit of stage 181. The resetting operation is performed by manually closing switch 184. With the switches in position B, a high impedance 190 is added in series with a movable contact 186 to render the stage 181 nonresponsive to pulses from the counter 172. The stage 182 is rendered nonresponsive to flyback pulses from the oscilloscope 33 by the high impedance 189. The high impedance 189 is connected in series circuit by way of the jumper between contacts A and B of the switch including the movable contact 187.

To render the system responsive to an initiating pulse from the counter 172, arming switch 191 is closed by the operator to short-circuit the high impedance 190 and permits the application of the initiating pulse to the input circuit of the stage 181. This gives the operator the opportunity of selecting the frequency at which the moveout correction is to take place.

The system is made fully automatic by moving the contacts 186, 187, and 156 to position C. The circuits now completed omit the high impedances 190 and 189, respectively, from the input circuits of the stages 181 and 182. Now the multivibrator 180 will respond to the counter 172 to initiate the generation of a correcting function each time the seismogram is repeated by the playback system 30. The multivibrator, particularly stage 182, will respond to a pulse from the oscilloscope to reset the function generator. More particularly, the pulse from the oscilloscope is a flyback pulse signifying both the end of the oscilloscope sweep and normally the end of the seismogram.

The time at which the start signals are applied to the oscilloscope 31, 33 and to the multivibrator is controlled by the counter 172. The counter, as described in the aforesaid article, may be set to generate a start signal or pulse coincident with the time-break signal or to delay the generation a selected time interval after the time-break signal. The counter has applied to it the pulses of a timetrack recorded with the time-break pulse. These pulses, which may be at a frequency of one kc., are counted to a preset count, at which time the counter generates the start signal.

In one operative arrangement, the counter 172 was arranged to delay the first time-break pulse for a period of one-half second. This delay was added to take into account the fixed delay inherent in the time delay drum and represents the total delay for a seismic pulse to be moved by the drum 20 from a recording head 21a to the remotest pickup head 21b. With the particular drum employed and with the recording heads as closely spaced as possible to the pickup heads, there was a delay of one-quarter second. With the heads initially staggered for a maximum stepout correction, an additional one-quarter second delay was added between the remotest pickup head and its associated recording head.

It will be understood that with physical differences ascribed to particular time delay drums, the time delays introduced by the counter 172 will be varied.

Where it is desired to view only a selective portion of the seismic record and yet having the desired correction take place compensatory of moveout error, a second counter 172a may be added and switch 173 opened and switch 173a closed. With such an arrangement, the counter 172 controls the time at which the function generator begins operation while the counter 172a controls the time at which the sweep of the oscilloscope 31, 33 is begun. The function generator, once operation is initiated, will continue to produce a continuous correcting function even though the seismic record is not being displayed. The synchronism between the seismic record and the corrective function will continue so that at the time of the sweep of the oscilloscope is begun, the seismic record is exactly compensated for moveout error and a true representation of subsurface earth strata will be observed at the face of the oscilloscope 31, 33.

The mechanism for adjusting the various pickup heads 22a–22f relative to the recording heads 23a–23f and in a manner compensatory of moveout error is effectively a proportioning system. It is comprised of a plurality of driving means 200–205 cooperating to generate a family of functions related to the distances between the various geophones and their distance to the shotpoint.

The time-delay drum 20 and the proportioning mechanism 39, as schematically disclosed in FIG. 4B, are arranged to correct a six-trace seismogram. The recording heads 21a–21f, pickup heads 22a–22f, and erase heads 23a–23f are positioned about the periphery of the drum 20 and along its length to make maximum use of the available recording surface of the drum. The positioning is symmetric with each recording track of the drum having associated therewith two sets of recording heads, pickup heads, and erasing heads. Each of the pickup heads 22a–22f is mounted on an arcuate track 199 for movement relative to its associated recording head 21a–21f.

The movement of each of the pickup heads 22a–22f is effected by an associated driving means 200–205 comprising the proportioning system 39. Each of the driving means 200–205 is substantially identical. The description of one, driving means 200, will be adequate for the understanding of all.

The driving means 200 transmits motion from shaft 121 to the pickup head 22a. The train of transmission from shaft 121 is by way of gear 206, gear 207, shaft 209, proportioning gear 210a, rack 211, rack 212, pinion 213, pulley 214, rotatably mounted on shaft 213a, and wire 215. The wire 215 rides on pulleys 214 and 216, and has opposite ends connected to a carriage supporting the pickup head 22a.

The proportioning gears 210a–210c are fixed to shaft 209, and the proportioning gears 210d–210f are fixed to shaft 219. The desired family of functions to be generated by the proportioning system 39 is produced by selecting a different number of teeth for each of the gears 210a–210f. The selection is based upon the character of the geophone spread employed when the seismogram was made. In all instances the gear teeth bear a squared relation to one another. This is evident from Equation 9 where it is shown that the moveout error varies as the square of the horizontal distance between the shotpoint and a detector. Thus, for example, where a symmetrical spread has been employed with the first geophone spaced X feet from the shotpoint, the second geophone spaced 2X feet from the shotpoint, the third geophone spaced 3X feet, etc., the gear associated with the first geophone would have one tooth, the gear associated with the second geophone would have four teeth, and the gear associated with the third geophone would have nine teeth. If the spread includes twelve geophones, the gear associated with the last geophone would have 144 teeth. As will be shown, where the number of teeth on a gear is reduced to a low number, one or four, for example, it will be preferred to employ some other means in substitution for a gear; a cam and cam follower, for example.

With the proportioning gears coupled together to shaft 121, the setting of a time-delay into one pickup head as dictated by the function F, FIG. 5, will automatically set the others. If the delay for the last trace of a six-trace seismogram is 36 milliseconds, the other delays will be set automatically as 25 milliseconds, 16 milliseconds, etc.

The time-delay drum and the associated mechanism may be arranged to correct seismic records made employing various geophone spreads. As is well-known, many forms of spreads are employed in the seismic art. In some cases the distance between the geophones will be X, with the distance from the shotpoint to the first geophone substantially greater than X, perhaps 100X. Yet all traces of the seismogram may be corrected simultaneously by selecting the proper proportioning gears.

On the other hand, it may be desirable to remove the moveout error from each seismic trace individually. Such a method may be used where the geophone spread is not uniform. In such a case, a function is calculated for each trace from known acoustic velocities of the earth over which the seismic record is taken. The function is set into the function generator and the seismic traces played back one at a time, employing only one set of the recording, pickup, and erase heads. The resulting corrected seismic records are then sequentially recorded to form a true seismic section.

A preferred embodiment of the proportioning system of the present invention is illustrated in FIGS. 7 and 7A. The proportioning system is arranged to correct the moveout error for at least two different types of geophone spreads.

The two spreads selected for purposes of illustration are: one in which the geophones are uniformly spread to one side of the shotpoint, and the other in which the geophones are uniformly spread on opposite sides of the shotpoint. The illustrated embodiment is arranged to compensate twelve traces simultaneously. Gears and/or cams 210a–210l are fixed to shafts 209 and 219 and are arranged to remove moveout error from a seismogram made with geophones spaced to one side of the shotpoint. Cams are employed in order to obtain a continuous, uniform transfer of motion otherwise difficult to obtain with gears having a small number of teeth. The gears and/or cams 210a–210l decrease in number of teeth or points from the greatest, gear 210a, to the smallest, cam 210l. More specifically, gear 210a has 144 teeth while cam 210l would be equivalent to a gear of 1 tooth. In those cases where the correction for the first trace is very small, the cam 210l may be dispensed with.

The second family of gears or cams 220a–220l is comprised of two identical groups. The gears or cams 220a–220f decrease in size from the gear 220a to the cam 220f. The gears or cams 220g–220l increase in size from the cam 220l to the gear 220g. The gear 220g is equal in size to the first gear 220a, and the cam 220f is equal to the cam 220l. This arrangement removes moveout error from seismic records produced with geophones spread on opposite sides of the shotpoint.

The shafts 209, 219 are driven from the shaft 121 by way of a gear box including the gears 206, 207, and 208. For the correction of a given seismogram only one family of gears and/or cams is coupled to the pickup heads. For a seismogram made by employing a different spread, the second family of gears and/or cams will be coupled to the pickup heads. The change in coupling is accomplished by way of a gear shifting arrangement employing cams 221 and 222. These cams engage ends 209a, 219a of the shafts 209 and 219. The shaft ends 209a, 219a operate as cam followers and are forced by springs 223, 224 into engagement with the surfaces of the cams 221 and 222. When it is desired to change gears and/or cams, the levers 225 and 226 are rotated, respectively, to rotate cams 221, 222 and thereby shift the position of the shafts 209 and 219 so as to disconnect the first family of gears and/or cams from and to couple the second family of gears and/or cams to the pickup heads 22.

A plurality of driving means, for example, like the driving means 200–205 of FIG. 4B are supported in driving relationship with the gears 210a–210l or 220a–220l by a series of lateral plates 230, secured to a central supporting shaft 231. The lateral plates are spaced from the families of gears above enumerated as shown in FIG. 7A to permit the shifting operation when required.

A preferred form of driving arrangement is illustrated in FIG. 6 and comprises racks 211, 212 and pinion 213. The driving means 200 includes a body portion or base 235. The driving means 200 in operative relation with the proportioning system 39, FIG. 7, is supported at one end by one of the lateral supporting plates 230. A screw 236a, having a knurled head, secures the one end of the driving means 200 to the supporting plate 230. The rack 211 is slidably mounted for movement relative to the base 235. The rack 211 moves on a track defined by spaced end plates 236, only one of which is shown. The movement of the rack 211 is transmitted to the rack 212 by way of adjusting assembly 237. The rack 212 is also slidably mounted for movement relative to the body portion 235 on a track provided by spaced plates 238 and end supporting plates 239. The construction of the track provided by the end supporting plates 239 is shown in the partial cross-section view of FIG. 8.

The motion of rack 212 is transmitted to the pinion 213 which is rotatably mounted on shaft 213a supported by the end supporting plates 239. In the preferred embodiment, the shaft 213a is a stub shaft supporting the pulley 214. A common shaft may be employed for all the pinion-pulley arrangements as shown in FIG. 4B.

When a gear is employed as a proportioning device, for example, the gear 210a, FIG. 7, it will directly engage the rack 211. When a cam is employed, for example, the cam 210k, a modification is required. The modification, as illustrated in FIG. 6, includes a bifurcated carriage 240 secured to the rack 211. The inner portions or surfaces of bifurcated ends 241 provide cam following surfaces.

The cam following surfaces are supported adjacent the cam 210k by guiding members 241a mounted on portions 241 and engaging a side of the cam 210k. The cam 210k engaging the cam following portions or members 241 provides a continuous, uniform adjustment of the rack 212, resulting in an accurate positioning of the pickup heads 22.

Correction for the time delays introduced by weathered or unconsolidated layers are also made by means of the present invention. More specifically, the correction is made by adjusting assembly 237. It comprises internally threaded member 242 which cooperates with screws 243 and 244 to vary the position of the rack 212 relative to the body portion 235. The adjustment of the knurled member 242 may also correct for changes in elevation or datum points. The corrections effected by the assembly 237 are illustrated in FIG. 1 wherein the weathered layer is identified by the reference character 14. The geophones 10–12 are shown positioned at the top of the weathered layer and their corrected positions 10a–12a are illustrated at a datum line D. The correction for weathering and datum is well-known in the art. For further treatment of the subject, reference may be had to page 501, et seq. of Exploration Geophysics by Jakosky.

Now that the various embodiments of the present invention have been described, it will be understood that other modifications will now be apparent to those skilled in the art and are intended to be included within the scope of the appended claims.

What is claimed is:

1. Apparatus for removing the effects of normal moveout on the relative times of occurrence of corresponding events of a plurality of seismic traces produced by spaced seismic detectors comprising a reproducible recording medium for recording at least portions of said traces, a plurality of pickup heads movable relative to said medium for reproducing said portions of said traces, a function generator for producing a continuous electrical signal function representative of the normal moveout error, means including a proportioning system for generating in response to said signal function a family of functions related to each of said pickup heads in accordance with the original physical disposition of their related detectors to each other and to a shotpoint, and means responsive to said family of functions for moving said heads relative to one another to vary the time relationship between the events recorded on said reproducible recording medium.

2. The apparatus of claim 1 in which said proportioning system is a mechanical means having a single input and a plurality of outputs and means for applying to said input a signal representative of said signal function.

3. The apparatus of claim 2 in which said mechanical proportioning system includes a plurality of driving means coupled to said input and each associated with a separate one of pickup heads to effect a movement between said pickup heads in a manner following a square-law relation.

4. In a system for displaying seismic records, said system being of the type in which there is utilized a reproducible recording of a plurality of seismic traces and employing a time-break signal to initiate the operation of a visual display system upon a predetermined period after the occurrence of said time-break signal, the combination which comprises an arrangement for correcting seismic records for moveout error introduced by the geometrical array of geophones spaced from a shotpoint, said arrangement including a time-delay recording drum having associated therewith a plurality of recording heads, detecting heads, and erasing heads, each set of recording heads, detecting heads, and erasing heads being associated with a given seismic trace, a function generator for producing a continuous, single-valued electrical signal function representative of the moveout error, means for driving said function generator to produce variations of said function with respect to time, control means responsive to said time-break signal for initiating operation of said driving means, means responsive to said function for individually moving said detecting heads relative to their associated recording heads and to said drum, said last-named means including a balanceable transducer for translating said electrical signal function to a mechanical function, means for modifying the movement of said detecting head moving means in accordance with the square of the spatial relation between adjacent geophones to produce signals representative of seismic traces free from moveout error, and means for applying said last-named signals to the visual display system.

5. A system for dynamically producing seismic records free of moveout error comprising a playback system for reproducing a previous, uncorrected recording of a plurality of seismic traces, said recording including a time-break signal signifying the beginning of the recording, a time-delay recording drum, means for recording on said drum said seismic signals reproduced by said playback system, a plurality of detecting heads, a function generator for producing a continuous signal function representative of the moveout error, means responsive to said function for adjusting the positions of said detecting heads relative to each other and to said time-delay recording drum in accordance with the geometrical array of detectors productive of said traces, means for driving said function generator to produce variations of said function with respect to time, means for initiating the operation of said driving means in time relation with the occurrence of said time-break signal, a cathode-ray oscilloscope, means for connecting said detecting heads to said cathode-ray oscilloscope for displaying said seismic signals at the face of said oscilloscope, means responsive to said time-break signals to initiate the display of said seismic signals, and means for adjusting the character of the function produced by said function generator during the time said seismic waves are being displayed to produce at the face of said cathode-ray oscilloscope a seismic record free of moveout error.

6. The system of claim 5 in which said cathode-ray oscilloscope produces a flyback signal at the end of the visual display of said seismic signals, and means responsive to said flyback signal to cause the reversal of said driving means to return said function generator to a start position.

7. The system of claim 5 in which a means is provided for delaying the initiation of said function driving means until the seismic signals from the playback system appear at said detecting heads.

8. The system of claim 7 in which said delay means is a counter having an output circuit connected to said function generator driving means and to said cathode-ray oscilloscope.

9. The system of claim 5 in which a selected portion of the seismogram is to be displayed and corrected and including two delay means, one of said delay means having an output circuit connected to said function generator driving means and effective to initiate the operation of said driving means at a time concurrent with the arrival of seismic signals at said pickup heads, a second of said delay means having an output connected to said cathode-ray oscilloscope and effective to initiate the operation of said oscilloscope at a time subsequent to the initiation of said function generator driving means to display a selected portion of a corrected seismogram at the face of the cathode-ray oscilloscope.

10. A system for correcting seismic signals for moveout error introduced by the spacing between geophones and a shotpoint comprising a function generator for producing a continuous, single-valued electrical signal function representative of the moveout error, a recording medium, means for recording on said medium at least a portion of each of a plurality of uncorrected seismic traces, a plurality of detectors each associated with one of said traces and spaced from said recording means, means for moving said recording medium relative to said recording means and said detectors as a group, means including a balanceable network for individually adjusting said detectors relative to said recording means in accordance with the instantaneous values of said signals funnction, and means for modifying said adjustment of said detectors relative to one another in acordance with the square-law relationship of the geophone spacing to generate electrical signals representative of seismic traces free of normal moveout error.

11. In the system of claim 10, the combination which comprises a function driving means including a continuously operable motor, a clutch having one plate mechanically coupled directly to a shaft of said motor, a second clutch having a plate coupled to the shaft of said motor by way of a gearing arrangement for driving said plate of said second clutch faster than said plate of said first clutch, each of said clutches having a second plate, means for mechanically coupling said second plates to a common shaft connected to said function generator, a control means, said clutches being individually energized under control of said control means for driving said function generator in one direction or another.

12. A system for removing from a seismogram the normal moveout error introduced by the spacing between the detecting stations and a shotpoint comprising a function generator for producing a continuous, single-valued electrical signal function representative of the normal moveout error, a time-delay drum, means for sequentially recording portions of the seismogram on said time-delay drum, a plurality of detecting means responsive to said sequential recordings for electrically reproducing said seismogram, means responsive to said signal function for individually and continuously moving said detecting means relative to said recording means, said responsive means comprising a proportional generator for producing a family of functions related one to the other in a manner representative of the square of the horizontal distance between the detecting stations and the shotpoint, and means for transmitting to each of said detectors a mechanical motion related to the specific function produced for the detecting means in adjustment of detector position relative to said recording means.

13. The system of claim 12 in which each of said transmitting means comprises a base having a rack mounted at one end for engagement with the mechanical output of said proportioning means, and means at an opposite end of said base for mechanically coupling said rack to its associated detecting means.

14. The system of claim 13 in which said transmitting means includes means for adjusting the distance between said rack and said mechanical coupling means to introduce a weathering correction.

15. A system for correcting seismic signals for moveout error introduced by the spacing between geophones and the shotpoint, comprising a function generator for producing a continuous single-valued electrical signal function representative of the moveout error, said function generator comprising a plurality of parallel-connected potentiometers connected across a source of current and each having slidable contacts electrically connected to selected taps on a continuous potentiometer, driving means for said function generator comprising a motor, a first clutch having a plate connected to a shaft of said motor, a second clutch having a plate connected to said motor for movement of said plate of said second clutch at a rate of speed higher than said plate of said first clutch, each of said clutches having a second plate mechanically coupled to a common shaft for driving a slidable contact of said continuous potentiometer in one direction for production of said function whose magnitude varies with time and for driving said slidable contact in an opposite direction for returning said contact to a start position, means for energizing said first clutch for production of said function, means for deenergizing said clutch upon completion of said function and for connecting said second clutch for energization, means for energizing said second clutch to return said slidable contact to an initial position preparatory to the regeneration of said function, means responsive to return of said contact to said initial position for locking said shaft in a fixed position to assure the duplication of said function, a recording medium, means for recording on said medium at least a portion of each of a plurality of uncorrected seismic traces, a plurality of detectors each associated with one of said traces and spaced from said recording means, means for moving said recording medium relative to said recording means and said detectors as a group, means including a balanceable network for individually adjusting said detectors relative to said recording means in accordance with the instantaneous values of said signal functions, means for modifying said adjustment of said detectors relative to one another in accordance with the square-law relationship of the geophone spacing to generate electrical signals representative of seismic traces free of normal moveout error, and means for generating start signals for actuating said first clutch energizing means to begin the generation of said function in time relation with the recording of said uncorrected seismic traces.

16. A system for correcting seismic signals for moveout error introduced by the spacing between geophones and the shotpoint, comprising a function generator for producing a continuous single-valued electrical signal function representative of the moveout error, said function generator comprising a plurality of parallel-connected potentiometers connected across a source of current and each having slidable contacts, a main potentiometer having taps to which are electrically connected said contacts, said main potentiometer having a slidable contact, means for driving said slidable contact of said main potentiometer in one direction for production of said function whose magnitude varies with time and for driving said slidable contact in an opposite direction for returning said contact to a starting position, a recording medium, means for recording on said medium at least a portion of each of a plurality of uncorrected seismic traces, a plurality of detectors each associated with one of said traces and spaced from said recording means, means for moving said recording medium relative to said recording means and said detectors as a group, means including a balanceable network for individually adjusting said detectors relative to said recording means in accordance with the instantaneous values of said signal function, means for modifying said adjustment of said detectors relative to one another in accordance with the square-law relationship of the geophone spacing to generate electrical signals representative of seismic traces free of normal moveout error, and means for generating starting signals for actuating said moving means to begin the generation of said signal function in time relation with the recording of said uncorrected seismic traces.

17. Apparatus for removing the effects of normal moveout of the relative times of occurrence of corresponding events of a plurality of seismic traces on a seismogram produced in response to signals from spaced seismic detectors comprising a reproducible recording medium for recording at least portions of said traces, a plurality of pickup heads associated with said medium and movable with respect thereto for reproducing said portions of said traces, a function generator for producing a continuous electrical signal function representative of normal moveout error, means for driving said function generator for production of said function, means including a proportioning system for generating in response to said signal function a family of functions related to each of said pickup heads in accordance with the original physical disposition of their related detectors to each other and to a shotpoint, means for generating a signal representative of a time-break on the seismogram, said driving means being responsive to said signal to energize said function generator, and means responsive to said family of functions for moving said heads relative to one another in accordance with the geometrical relationship between the detectors to vary the time relationship between the events recorded on said reproducible recording medium.

18. Apparatus for dynamically removing the moveout error from a seismogram comprising means for generating a first signal in predetermined time relation with the instant of generation of seismic waves at a shotpoint, means for generating a second signal representative of said seismic waves at a detecting station spaced from said point of generation, means for simultaneously generating a single-valued electrical correcting function approximating the moveout error and varying with respect to time following said first instant of generation, means for sequentially shifting the components of said second signal relative in time to said first signal in response to said electrical correcting function, and means for varying the characteristic of said correcting function to generate a correcting function varying as the moveout error to produce a seismic record free of moveout error.

19. A system for dynamically producing seismic records free of moveout error comprising a playback system for repeatedly reproducing a previous uncorrected recording of a plurality of seismic traces, said recording including a timebreak signal signifying the beginning of the recording, a time-delay recording drum, means for recording on said drum said seismic signals reproduced by said playback system, a plurality of detecting heads, a function generator for producing a continuous signal function representative of the moveout error, means responsive to said function for adjusting the positions of said detecting heads relative to each other and to said time-delay recording drum, means for driving said function generator to produce variations of said function with respect to time, means responsive to said time-break signal for initiating the operation of said driving means in time relation with the occurrence of said time-break signal, and means for adjusting the characteristic of the signal function during the time said seismic waves are being played back to produce a seismic record free of moveout error.

References Cited in the file of this patent

UNITED STATES PATENTS

| | | | |
|---|---|---|---|
| 2,440,971 | Palmer | May 4, | 1948 |
| 2,684,463 | Wilentchik | July 20, | 1954 |
| 2,732,025 | Lee | Jan. 24, | 1956 |
| 2,799,821 | Hannig | July 16, | 1957 |
| 2,800,639 | Lee | July 23, | 1957 |
| 2,825,885 | Reynolds | Mar. 4, | 1958 |
| 2,835,856 | Moseley | May 20, | 1958 |
| 2,841,777 | Blake et al. | July 1, | 1958 |
| 2,886,795 | Thatcher | May 12, | 1959 |
| 2,990,535 | Parkinson | June 27, | 1961 |